Patented Sept. 6, 1927.

1,641,710

UNITED STATES PATENT OFFICE.

FREDERICK H. UNTIEDT, OF WASHINGTON, DISTRICT OF COLUMBIA.

PROCESS OF PREPARING GLYCOLS.

No Drawing.   Application filed June 11, 1926. Serial No. 115,357.

This invention relates to processes of preparing glycols and it comprises reacting with water, or water solutions of glycols, upon organic oxides containing the characteristic olefinic oxide group

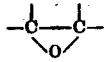

such as ethylene or propylene oxide, in the presence of a hydrating catalyst; all as more fully hereinafter set forth and as claimed.

The usual method of preparing glycols consists in hydrolyzing a chlorhydrin, such as propylene chlorhydrin, by means of a solution of an alkaline substance, such as sodium carbonate or bicarbonate; this solution being usually quite dilute. In this process, the chlorine atom of the chlorhydrin is replaced by a hydroxyl group. As a final product, dilute water solutions of the glycols are obtained. In order to obtain pure glycols, these solutions must be concentrated; an operation of some difficulty because of the relatively considerable vapor tension of these glycols.

It is an object of this invention to prepare strong or dry glycols without employing concentration by evaporation. It is another object of this invention to concentrate dilute glycol solutions by causing an organic oxide containing the group

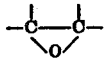

to react with at least a part of water present in a glycol solution whereby more glycol is formed in the solution at the expense of the water. That is, a solution of at least one glycol, which solution contains less than the desired amount of glycol, is treated with sufficient organic oxide, as defined, to give a glycol solution of the desired concentration. This desired concentration may be 50 per cent or greater, and is usually greater than 90 per cent. If desired, enough oxide may be supplied to form substantially anhydrous glycols.

Alkali metal hydroxides readily react with the chlorhydrins to form the corresponding oxides. These oxides, such as propylene and ethylene oxide, may be converted into glycols by dissolving them in water and heating, but the reaction, which is a hydration, in the absence of a catalyst, is slow and requires a long period of heating. In the case of propylene oxide for instance, the oxide dissolved in three times its volume of water must be heated for about seven hours before the conversion is complete.

In its broadest sense, my invention comprehends causing the reaction of organic oxide containing the olefinic oxide group

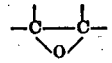

with quantities of water in such amount that concentrated glycols result in the presence of a hydrating catalyst such as sulfuric acid. Thus, for instance, propylene oxide is treated with a quantity of water sufficient to form at least a 90 per cent propylene glycol solution in the presence of a very small amount of sulfuric acid as a catalyst.

In a practical embodiment of my invention 58 pounds of propylene oxide is treated with 26.2 pounds of water containing 0.1 pound of sulfuric acid as a catalyst. A 90 per cent propylene glycol solution is formed. Less concentrated solutions, such as 50 per cent solutions, may be made by using an appropriate amount of water, but for most practical purposes it is desirable that the product made shall contain not more than 10 per cent water.

It is more advantageous for certain purposes, however, to treat the oxids with not more than just enough water to react with the oxids, since in this way anhydrous glycols, that is glycols free of water, result.

In making propylene glycol free of water, fifty-eight parts by weight (1 mol.) of propylene oxide are treated with eighteen parts (1 mol.) of water containing about .05 to 0.1 part of concentrated sulphuric acid. The mixture heats up spontaneously but I usually heat it further by heating under a reflux condenser, heating being continued until the oxide has been converted into propylene glycol. This usually requires fifteen to twenty minutes. The temperature during most of the heating does not tend to rise much above the boiling point of the propylene oxide, 35° C. The use of a reflux condenser prevents loss of oxide. While the oxide is a highly reactive and sensitive material, it is not injuriously affected by the catalyst during the hydration process, a result not previously appreciated by the art. Sometimes there may be a very slight aldehyde odor noticed in the resulting anhydrous glycol, but there is substantially no discoloration. Practically pure water-free propylene glycol results. After the reaction, the acid present may be neutralized with lime or sodium hydroxide; and the resulting insoluble sulfate filtered off. Or, as the quantity of sulfate is very small, it may be left with the glycol.

The hydration may be conducted at room temperature, but, as stated, I usually heat to some extent. While it takes many hours to hydrate the oxide without the use of a catalyst and it has never been possible to hydrate the oxide with only sufficient water to form dry glycol at room temperature without a catalyst, in the presence of a catalyst, such as sulphuric acid, and with the quantities given in the preceding example, hydration is complete at the end of three hours.

Ethylene oxide may be used in a like manner and the rate of hydration is even quicker than when propylene oxide is used. In the case of ethylene oxide, which is gaseous, the reaction mixture is preferably chilled so as to retain the oxide in the reacting mixture until hydration is complete. Ethylene oxide boils at about 13° C. If desired, hydration may be carried out under pressure in a closed vessel.

Instead of using just enough water to react with all of the oxide present so as to form anhydrous glycols, I may use less than this quantity of water, say 50 or 75 per cent of the theoretical quantity of water. By using less than the required amount of water, I can obtain anhydrous glycols containing olefinic oxides dissolved therein. For certain purposes this is desirable.

The various higher oxides such as the butylene oxides, and mixtures of the various organic oxides as above defined, react in the same way as ethylene and propylene oxides. In fact, the reaction is a general one for organic oxides possessing the characteristic olefinic oxide group

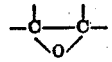

Glycol solutions to which a hydrating catalyst has been added, can be treated with an organic oxide, as defined, to enrich them in glycol at the expense of the contained water. For example, 20 per cent propylene glycol solution, to which a small amount of sulphuric acid, about 0.3 to 0.5 per cent by weight of the water present has been added as a catalyst, can be treated with propylene oxide in sufficient quantity to react with all of the water present. In this way substantially anhydrous glycol solutions may be prepared, starting from dilute solutions. For certain purposes, a mixture of glycols is suitable or desirable. In such a case to such a 20 per cent propylene glycol solution, there can be added ethylene oxide until all of the water present is converted into ethylene glycol. The result is a water-free mixture of ethylene glycol and propylene glycol. Mixtures of propylene and ethylene or other oxides of the general type may be used in lieu of a single oxide.

The process also offers a method of concentrating glycol solutions to a desired higher concentration. As an example, a 20 per cent propylene glycol solution containing a hydration catalyst such as sulphuric acid can be concentrated to 90 or 95 per cent solution by adding only enough oxide to react with such a quantity of water present so that the resulting solution contains 10 or 5 per cent water. The quantity of oxide necessary to produce either an anhydrous solution or a solution of higher concentration, but still containing some water, can readily be determined from the amount of water present by simple stochiometrical calculations.

In every case where an acid such as sulphuric acid is used as a catalyst, the acid may be removed by neutralizing it with an alkali such as sodium hydroxide or calcium hydroxide, and the neutralization product removed, if desired.

As catalysts, in general it may be laid down that any substance which acts as a hydrating catalyst may be used. Such substances are well known in the art. They comprise for the most part, substances which in water solution liberate hydrogen ions and it may be said that with such compounds, the real catalyst is probably the hydrogen ion. Sulphuric acid is a typical well known example.

Strong concentrations of acids, such as sulphuric acid, rapidly react with the oxides and with glycols, resulting in aldehydic and polymerization products. For this reason, only catalytic quantities are used in the present invention. Any detrimental concentration is at once shown by discoloration and formation of aldehydic smelling substances. In the case of sulphuric acid, a concentration of 0.5 per cent is sufficient, although somewhat higher concentrations may be used if the reaction is carried out under cooling conditions.

What I claim is:—

1. In the catalytic hydration of organic oxides containing the olefinic oxide group

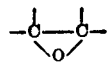

to glycols, the step which comprises treating at least one such oxide with water in sufficient quantity to react with all of the oxide but insufficient to form a glycol solution containing more than about 10 per cent water.

2. In the catalytic hydration of organic oxides containing the olefinic oxide group

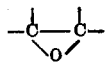

to glycols, the step which comprises treating at least one such oxide with just enough water to react with all of the oxide present.

3. In the catalytic hydration of organic oxides containing the olefinic oxide group

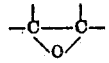

to glycols, the step which comprises treating propylene oxide with water in sufficient quantity to react with all of the oxide but insufficient to form a glycol solution containing more than 10 per cent water.

4. In the catalytic hydration of organic oxides containing the olefinic oxide group

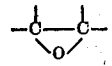

to glycols, the step which comprises treating propylene oxide with just enough water to react with all of the oxide present.

5. In the catalytic hydration of organic oxides containing the olefinic oxide group

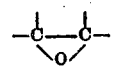

to glycols, the step which comprises treating a water solution of at least one glycol, which solution contains less than the desired amount of glycol, with a quantity of at least one such oxide in such amount that the resulting solution is of the desired glycol concentration.

6. In the catalytic hydration of organic oxides containing the olefinic oxide group

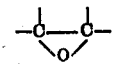

to glycols, the step which comprises treating a water solution of at least one glycol, which solution contains at least 10 per cent water, with a quantity of at least one such oxide in such amount that the resulting solution contains less than 10 per cent water.

7. In the catalytic hydration of organic oxides containing the olefinic oxide group

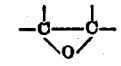

to glycols, the step which comprises treating a water solution of at least one glycol with enough such organic oxide to form a substantially anhydrous glycol solution.

8. In the catalytic hydration of organic oxides containing the olefinic oxide group

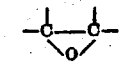

to glycols, the step which comprises treating a water solution of a glycol which water solution contains less than the desired amount of glycol, with such a quantity of the organic oxide corresponding to the glycol in solution that the resulting solution is of the desired glycol concentration.

9. In the catalytic hydration of organic oxides containing the olefinic oxide group

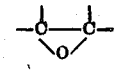

to glycols, the step which comprises treating a glycol solution containing at least 10 per cent water, with such a quantity of the oxide corresponding to the glycol in solution that the resulting solution contains less than 10 per cent water.

10. In the catalytic hydration of organic oxides containing the olefinic oxide group

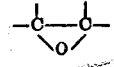

to glycols, the step which comprises treating a water solution of a glycol with enough of the corresponding organic oxide to form a substantially anhydrous glycol solution.

11. In the catalytic hydration of organic oxides containing the olefinic oxide group

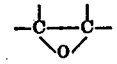

to glycols, the step which comprises treating a water solution of propylene glycol, which solution contains less than the desired amount of glycol, with a quantity of propylene oxide in such amount that the resulting solution is of the desired glycol concentration.

12. In the catalytic hydration of organic oxides containing the olefinic oxide group

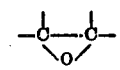

to glycols, the step which comprises treating a propylene glycol solution containing at least 10 per cent water, with a quantity of propylene oxide in such amount that the resulting solution contains less than 10 per cent water.

13. In the catalytic hydration of organic oxides, containing the olefinic oxide group

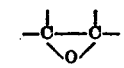

to glycols, the step which comprises treating a water solution of propylene glycol with enough propylene oxide to form a substantially anhydrous propylene glycol solution.

In testimony whereof, I have hereunto affixed my signature.

FREDERICK H. UNTIEDT.